3,328,324
CROSS-LINKING POLYMERS WITH AROMATIC POLYAZIDES
David S. Breslow and Frank E. Piech, Wilmington, Del., assignors to Hercules Incorporated, a corporation of Delaware
No Drawing. Filed June 30, 1964, Ser. No. 379,369
12 Claims. (Cl. 260—22)

This invention relates to cross-linking polymers and to vulcanizates so produced. More particularly, the invention relates to cross-linking certain coating polymers with aromatic polyazides.

Nitrocellulose, alkyds and triallyl pentaerythritol derivatives are well known for their ability to be formulated into coating compositions. However, the end products all suffer a serious drawback in that they tend to be soft, soluble in most organic solvents, and low in chemical and heat resistance.

It has now been discovered that nitrocellulose, alkyd resins and triallyl pentaerythritol derivatives can be cross-linked by heating in the presence of an aromatic polyazide to produce vulcanizates that are solvent resistant, have increased hardness, stiffness, and chemical and heat resistance.

Any nitrocellulose, varying in nitrogen content from 10.5% to 13.5% and varying in viscosity from ⅛ sec. to 100 sec. (ASTM D301–56) can be used in this invention.

Any alkyd resin, including drying and non-drying alkyds, can be cross-linked in accordance with this invention. Basically the alkyd resins are prepared from a polyhydric alcohol and a polybasic acid or anhydride, but are often modified with drying, semi-drying, and non-drying oils. Typical polyhydric alcohols are glycerol, ethylene glycol, diethylene glycol, sorbitol, mannitol and pentaerythritol. Typical polybasic acids and anhydrides are phthalic anhydride, phthalic acid, isophthalic acid, maleic acid, maleic anhydride, fumaric acid, succinic acid, adipic acid, sebasic acid, malic acid and tartaric acid. Typical drying and semi-drying oils are linseed oil, soya oil, perilla oil, fish oil, tung oil, sunflower oil, walnut oil, oiticia oil and dehydrated caster oil. Typical non-drying oils are cottonseed oil and coconut oil.

Any triallyl pentaerythritol ether, such as the diallylidene pentaerythritol ether of triallyl pentaerythritol or the triallyl pentaerythritol esters such as the linseed acid ester of triallyl pentaerythritol, can be cross-linked in accordance with this invention.

Any aromatic polyazide, i.e., any compound having the general formula $R(N_3)_x$ where R is an aromatic grouping inert to the cross-linking reaction and $x$ is an integer greater than 1, can be used in the process of this invention. Preferably, $x$ will be an integer from 2 to 100 and R will be selected from the group of organic radicals consisting of arylene and alkarylene radicals. Exemplary of the aromatic polyazides useful in this invention are m-phenylene diazide, 2,4,6 - triazidobenzene, 4,4' - diphenyl diazide, 4,4' - diphenylmethane diazide, 4,4' - diazidodiphenylamine, 4,4'-diazidodiphenylsulfone, 2,2' - dinitro-4,4' - diazidodiphenyl, 2,7 - diazidonaphthalene and 2,6-diazidoanthraquinone. It will be obvious to those skilled in the art that still other aromatic polyazides containing functional groups, which are inert to cross-linking reactions, such as halogen, ester, azo, etc., groups are included in the above definition. These functional groups should, however, be meta or para to the azido group so as not to hinder cross-linking activity.

The cross-linking process of this invention can be carried out by heating the polymer plus the aromatic polyazide to a temperature at which the polyazide decomposes. The temperature will vary over a wide range, but in general will be in the range of from about 90° C. to about 300° C. Various amounts of the cross-linking agent can be added, the optimum amount depending on the amount of cross-linking desired, the specific aromatic polyazide employed, etc. In general, the amount added, based on the weight of the polymer, will be from about 0.1% to about 20%.

The cross-linking agent can be incorporated with the polymer in any desired fashion. For example, it can be uniformly blended by simply milling or it can be dissolved or dispersed in a solution containing the polymer or dissolved or dispersed in a latex containing the polymer. By these means, the aromatic polyazide is distributed throughout the polymer and uniform cross-linking is effected when the blend is subjected to heat. Other methods of mixing the cross-linking agent with the polymer will be apparent to those skilled in the art.

In addition to the cross-linking agent, other ingredients can be incorporated in the polymer. Exemplary of such ingredients are extenders, fillers, pigments, dyes, plasticizers, driers, stabilizers, etc. Obviously, there are many cases in which these ingredients are not required or desired, and excellent results are achieved when only the cross-linking agent is added.

As stated above, the use of aromatic polyazide cross-linking agents is particularly advantageous in coating compositions prepared from the above polymers.

The following examples are presented for purposes of illustration, parts and percentages being by weight unless otherwise specified. A solubility test was used in the examples to evaluate the effectiveness of the aromatic polyazides as cross-linking agents. Cross-linked compositions are no longer soluble in active solvents.

*Examples 1–3*

Three samples of different nitrocellulose coating compositions were cross-linked with 4,4'-diphenylmethane diazide. The formulation of each sample is shown in Table 1.

TABLE I

| Ingredients (Parts) | Example Number | | |
|---|---|---|---|
| | 1 | 2 | 3 |
| Nitrocellulose [1] | 20 | 14 | 8 |
| Coconut Oil | 20 | | |
| Drying Alkyd [2] | | 42 | |
| Nondrying Alkyd [3] | | | 42 |
| Toluene | 30 | 21 | 19 |
| Ethanol | 9 | 7 | |
| Ethyl Acetate | 9 | 7 | 4 |
| Butyl Acetate | 12 | 9 | 30 |
| Phenyl-β-naphthylamine (anti-oxidant) | | 1.1 | |
| 4,4'-diphenylmethane diazide [4] | 4 | 5.5 | 3.25 |

[1] Contains 12% nitrogen and has a viscosity, by the falling ball method, of ½ second.
[2] Long, linseed, oil modified glyceryl phthalate alkyd.
[3] Medium, coconut oil modified pentaerythritol phthalate alkyd.
[4] Dissolved in ethylene dichloride.

Controls were prepared as above but without the aromatic diazide cross-linking agent. The resulting compositions were poured on glass panels. The glass panels were air dried overnight and then baked for 10 minutes at a temperature of 150° C. The cured films were stripped from the glass panels for testing. Each of the films was tested by tumbling for 18 hours in butyl acetate at a temperature of 25° C. (1 gm. of film in 100 ml. of solvent). Those samples containing the diazide were insoluble while the controls were completely soluble.

*Examples 4–9*

Six samples of different alkyd baking enamels were cross-linked with 4,4'-diphenylmethane diazide. The formulation of each sample is shown in Table II.

TABLE II

| Ingredients (Parts) | Example Number | | | | | |
|---|---|---|---|---|---|---|
| | 4 | 5 | 6 | 7 | 8 | 9 |
| Nondrying alkyd [1] | 1.7 | | | | | |
| Semidrying alkyd [2] | | 2.0 | | | | |
| Semidrying alkyd [3] | | | 1.4 | | | |
| Semidrying alkyd [4] | | | | 1.5 | | |
| Drying alkyd [5] | | | | | 1.0 | |
| Nondrying alkyd [6] | | | | | | 1.7 |
| Toluene | 2.8 | | | | | 2.8 |
| Xylene | | 2.0 | | 2.3 | | |
| Mineral Spirits | | | 2.0 | | | |
| Phenyl β-naphthylamine (anti-oxidant) | | 0.02 | 0.02 | 0.02 | 0.02 | |
| 4,4'-diphenylmethane diazide [7] | 0.1 | 0.1 | 0.1 | 0.1 | 0.1 | 0.1 |

[1] Coconut oil modified pentaerythritol phthalate alkyd, 60% solids in toluene.
[2] Phthalic acid alkyd modified with 40% dehydrated castor oil, 50% solids in xylene.
[3] Phthalic acid alkyd modified with 62% soybean oil, 70% solids in mineral spirits.
[4] Phthalic acid alkyd modified with castor oil and soybean oil, 65% solids in xylene.
[5] Phthalic acid alkyd modified with 56% linseed oil, 100% solids.
[6] Sebacic acid alkyd modified with 50% castor oil, 60% solids in toluene.
[7] Dissolved in ethylene dichloride.

Control samples were prepared in the same manner except for the diazide cross-linking agent. The resulting enamels were poured on glass panels and allowed to air dry overnight. Each panel was baked for 1 hour at a temperature of 150° C. Each film was tested by tumbling for 18 hours in butyl acetate (except the film in Example 9, which was tumbled in toluene) at a temperature of 25° C. (1 gm. of film in 100 ml. of solvent). Those samples containing the diazide were insoluble while the controls were completely soluble.

*Examples 10 and 11*

Two samples of different triallyl pentaerythritol derivatives were cross-linked with 4,4'-diphenylmethane diazide. The formulation of each sample is shown in Table III.

TABLE III

| Ingredients | Example Number | |
|---|---|---|
| | 10 | 11 |
| Ether of diallylidene pentaerythritol with triallyl pentaerythritol [1] | 10 | |
| Ester of triallyl pentaerythritol and linseed acids | | 10 |
| Phenyl β-naphthylamine (anti-oxidant) | 0.2 | 0.2 |
| 4,4'-diphenylmethane diazide | 1.0 | 1.0 |

[1] Reacted in a ratio of 1 mole of diallylidene pentaerythritol to 2 moles of triallyl pentaerythritol.

Controls were prepared as above but without the aromatic polyazide cross-linking agent. The resulting compositions were poured on glass panels. The panels were air dried overnight and then baked for 1 hour at a temperature of 150° C. Each of the resulting cured films was tested by tumbling for 18 hours in butyl acetate at a temperature of 25° C. (1 gm. of film in 100 ml. of solvent). Those samples containing the diazide were insoluble while the controls were completely soluble.

What we claim and desire to protect by Letters Patent is:

1. A process of cross-linking a polymer selected from the group consisting of nitrocellulose, alkyd resins, triallyl pentaerythritol ethers, and triallyl pentaerythritol esters which comprises heating said polymer in admixture with an aromatic polyazide cross-linking agent having the formula $R(N_3)_x$ where $x$ is an integer from 2 to 3 and R is an aromatic radical inert to the cross-linking reaction, selected from the group consisting of arylene and alkarylene radicals.

2. The process of claim 1 wherein the polymer is nitrocellulose.

3. The process of claim 1 wherein the polymer is a phthalic acid alkyd.

4. The process of claim 3 wherein the phthalic acid alkyd is a drying alkyd.

5. The process of claim 3 wherein the phthalic acid alkyd is a nondrying alkyd.

6. The process of claim 1 wherein the polymer is a triallyl pentaerythritol ether.

7. The process of claim 1 wherein the polymer is a triallyl pentaerythritol ester.

8. A polymer selected from the group consisting of nitrocellulose, alkyd resins, triallyl pentaerythritol ethers and triallyl pentaerythritol esters cross-linked by heating in admixture with an aromatic polyazide having the formula $R(N_3)_x$ where $x$ is an integer from 2 to 3 and R is an aromatic radical inert to the cross-linking reaction, selected from the group consisting of arylene and alkarylene radicals.

9. The product of claim 8 wherein the polymer is nitrocellulose.

10. The product of claim 8 wherein the polymer is an alkyd.

11. The product of claim 8 wherein the polymer is a triallyl pentaerythritol ether.

12. The product of claim 8 wherein the polymer is a triallyl pentaerythritol ester.

References Cited

UNITED STATES PATENTS 2,852,379   9/1958   Hepher et al. _____ 96—36.4
3,187,020   6/1965   Minisci _____ 260—349

DONALD E. CZAJA, *Primary Examiner.*

LEON J. BERCOVITZ, R. W. GRIFFIN,
*Assistant Examiners.*